F. WILLIAMS.
HEATING DEVICE FOR EVAPORATORS, PARTICULARLY EVAPORATORS FOR DRYING FRUIT.
APPLICATION FILED FEB. 25, 1921.

1,388,153.

Patented Aug. 16, 1921.

INVENTOR
FRANCIS WILLIAMS
BY
ATTORNEYS

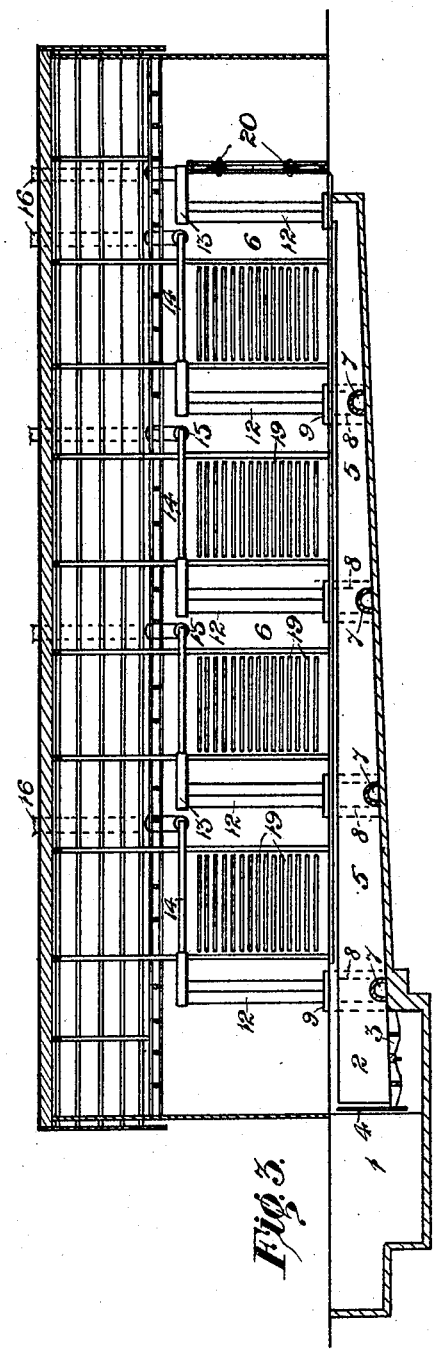

F. WILLIAMS.
HEATING DEVICE FOR EVAPORATORS, PARTICULARLY EVAPORATORS FOR DRYING FRUIT.
APPLICATION FILED FEB. 25, 1921.
1,388,153.
Patented Aug. 16, 1921.
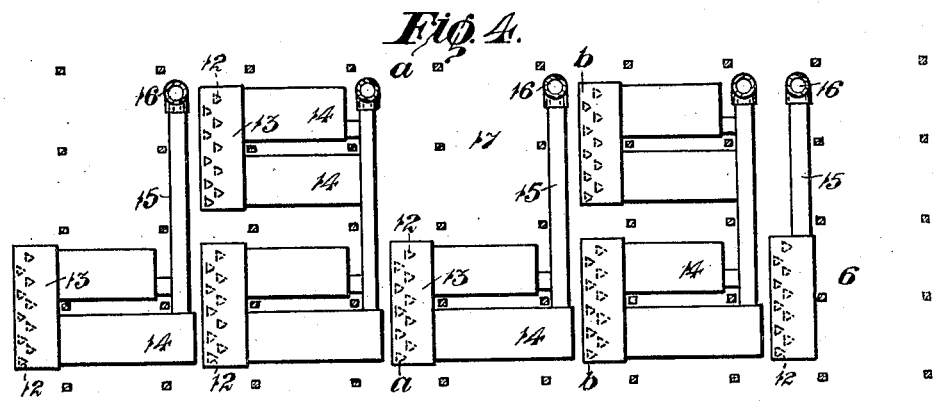
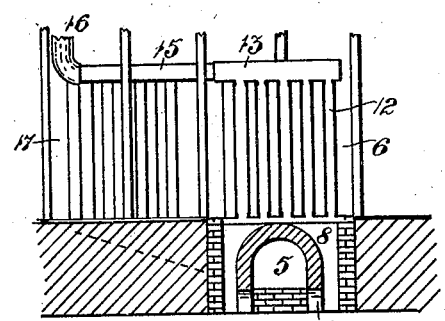
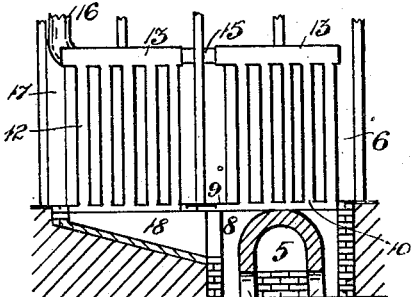
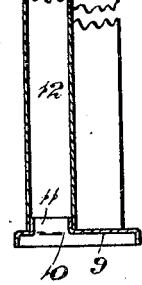
INVENTOR
FRANCIS WILLIAMS
BY
ATTORNEYS

UNITED STATES PATENT OFFICE.

FRANCIS WILLIAMS, OF ADELAIDE, SOUTH AUSTRALIA, AUSTRALIA.

HEATING DEVICE FOR EVAPORATORS, PARTICULARLY EVAPORATORS FOR DRYING FRUIT.

1,388,153.   Specification of Letters Patent.   Patented Aug. 16, 1921.

Application filed February 25, 1921. Serial No. 447,872.

*To all whom it may concern:*

Be it known that I, FRANCIS WILLIAMS, a subject of the King of Great Britain and Ireland, residing at C. B. S. Building, 90 King William street, Adelaide, State of South Australia, Commonwealth of Australia, have invented certain new and useful Improved Heating Devices for Evaporators, Particularly Evaporators for Drying Fruit, (for which I have obtained a patent in Australia, No. 14,235, Feb. 3, 1920,) of which the following is a specification.

This invention relates to improved heating devices for evaporators, particularly evaporators for treating and drying fruit, and it has been specially devised in order to provide devices whereby the air in the evaporator may be heated evenly and effectively without contact with the furnace gases. These improved heating devices are especially applicable to evaporators for drying fruit wherein an evaporating chamber and a wilting room are situated side by side medially of a building with a preparing room outwardly of the evaporating chamber and sulfuring chambers outwardly of the wilting room, and wherein racks or trays bearing the materials to be treated are traversed from end to end of the building through the several rooms and chambers. But it is to be understood that this invention is not confined in its application to the type of evaporators referred to and that it may be readily adapted to other types.

According to this invention there is a furnace below one end of the evaporating chamber. From the rear of the furnace a long horizontal flue extends beneath the evaporating chamber and in this flue are openings leading to chambers situated above the horizontal flue. These chambers are each in communication with a set of peculiarly arranged vertical radiator tubes or pipes that extend the full height and breadth of the evaporating chamber and are adapted to heat air passing through the chamber, such air passing between and around the tubes. These radiator tubes are preferably of triangular shape in cross section (or they may be of any other shape) and they are arranged in two or more rows the tubes or pipes in each row being staggered relatively to the tubes or pipes in the next row. At the upper ends these tubes or pipes lead into horizontal radiator boxes that extend a short distance along the evaporating chamber near its top and terminate in an outlet flue.

When the wilting room adjoins the evaporating chamber sets of tubes or pipes and radiator boxes are provided therein, hot gases being directed thereto through branch flues from the chambers above the main horizontal flue. Air is drawn through the evaporating chamber by fans and when the wilting room adjoins it the heated air is directed thereto by a baffle, further fans being provided to increase the current of air through the wilting room if desired.

But in order that this invention may be more readily carried into practical effect it will now be described with reference to the accompanying drawings in which—

Fig. 2 is a longitudinal section thereof while

Fig. 3 is a transverse section on a slightly larger scale.

Fig. 4 is a detail plan view showing the arrangement of the radiator tubes, radiator boxes and outlet flues.

Fig. 5 is a section on line *a a* of Fig. 4 and

Fig. 6 is a section on line *b b* of Fig. 4.

Fig. 7 is an enlarged detail view, partly in section, of a radiator tube and box while Fig. 8 is a plan of part of a base plate of a set of radiator tubes.

Figure 1:
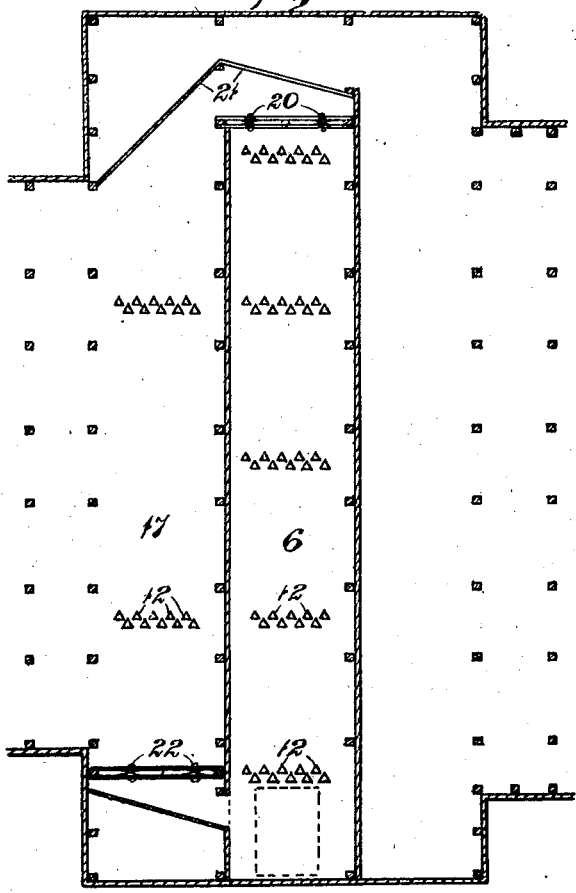
Figure 1 is a diagrammatic plan of an evaporating chamber and wilting room (with parts of the adjoining preparing room and sulfuring chambers) showing the position therein of the radiator tubes or pipes.
Figure 2:
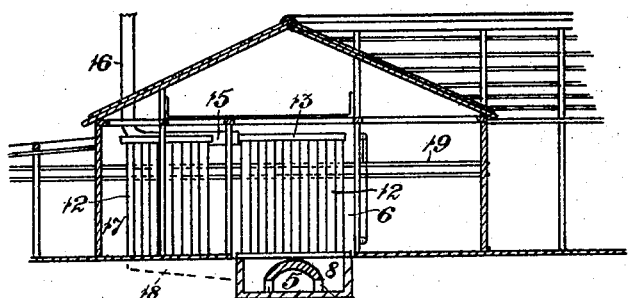

At one side of the building is a shallow pit 1 in which is a furnace 2. The furnace 2 has a grate 3 and a door 4 and at the rear it leads into a horizontal flue 5 that extends beneath the evaporating chamber 6. At intervals there are pairs of outlet openings 7, one on each side of the flue 5, leading into chambers 8. Each chamber 8 is covered by a plate 9 in which are formed openings 10 to receive vertical tubes with edge flanges 11. The openings 10 are arranged or pipes 12. in rows, relatively staggered, and preferably they are of triangular form or they might be round or diamond shaped. The tubes or pipes 12 open at their upper end in a box 13 from each of which extends one or more shallow horizontal radiator boxes 14. These boxes 14 have an outlet into a flue pipe 15 leading to a chimney 16. If the wilting room 17 is also to be heated passages 18 are provided from such of the chambers 8 as may be necessary to convey the hot gases to further sets of similar tubes and boxes in the wilting room. By means of dampers in the boxes 14 or the flue pipes 15 the amount of hot gases flowing through each set of vertical pipes 12 can be increased or reduced to regulate the heat imparted to the air which passes through the spaces between the pipes and over the trays 19. By this means the air that has passed over the first set of trays and has thereby had its temperature reduced may be reconditioned before passing over the second set of trays and so on for each succeeding set of trays. The extension passages 18 and further sets of tubes 12 may be provided on each side of the evaporator room.

The wilting room 17 is positioned alongside the evaporating room and is used for wilting fruit prior to passing it into the evaporating chamber 6. It is heated in part by the passage therethrough of the hot but moisture laden air which has already been passed through the evaporating room.

Fans 20 are provided near the rear of the evaporating chamber 6 to regulate the draft therethrough and a baffle 21 directs the air current into the wilting room 17. Fans 22 may be provided to further increase the air current through the wilting room if desired.

In operation it will be readily understood that when a fire is lighted on the furnace grate 3 the hot gases will pass through the flue 5, the chambers 8, the tubes 12, the boxes 13 and 14 and the flues 15 to the chimneys 16. As the rows of tubes or pipes 12 are staggered all the air drawn through the evaporating chamber must strike the heating surface thereof and the boxes 14 complete the heating process.

What I claim is:—

1. In devices for heating evaporators:—a furnace below the evaporating chamber at one side thereof, a flue leading from the furnace and extending beneath said chamber to the other side of same, passages from said flue to a series of chambers positioned beneath the evaporating chamber and transversely thereof, sets of vertical tubes or pipes positioned in the evaporating chamber and corresponding in number to the said chambers and connected at their lower ends with said chambers and at their upper ends with horizontal radiator boxes at the top of the chamber and in communication with outlet flues.

2. In devices for heating evaporators as claimed in claim 1:—sets of vertical tubes or pipes arranged in rows transversely of the evaporating chamber there being two or more rows of tubes or pipes in each set and the tubes or pipes in each row being staggered relatively to the tubes or pipes in the next row.

3. Devices for heating evaporators comprising:—a furnace, a flue from said furnace, chambers in communication with said flue, vertical tubes or sets of tubes arranged in rows extending across the evaporating chamber and relatively staggered, each set of tubes being open at the lower end to a flue chamber, boxes at the upper end of said tubes extending horizontally a short distance along the upper part of the evaporating chamber, and outlet flues from said boxes.

4. In an evaporator wherein the evaporating chamber and the wilting room are side by side:—a furnace below one side of the evaporating chamber, a flue from said furnace extending beneath the evaporating chamber, chambers about said flue and in communication therewith, sets of vertical tubes or pipes positioned across the evaporating chamber and adapted to convey heated gases from the flue chamber to horizontal radiator-boxes in the upper part of the evaporating chamber, outlet flues from the radiator boxes, passages or extensions from one or more of the flue chambers, a set or sets of vertical tubes or pipes positioned across the wilting room adapted to convey hot gases from the passage or passages to horizontal radiator boxes near the top of the wilting room, connections between the boxes and the outlet flues, fans to regulate the draft through the evaporating chamber and a baffle to direct the air drawn through the evaporating chamber into the wilting room.

In testimony that I claim the foregoing as my invention I have signed my name in the presence of two subscribing witnesses this 18th day of January 1921.

FRANCIS WILLIAMS.

Witnesses:
ARTHUR GORE COLLISON,
STANLEY ROY CHASE.